Jan. 1, 1924

J. H. GRAY 1,479,662

SMELTING ORES OF LOW VOLATILE METALS AND MELTING SUCH METALS

Filed Feb. 17, 1921     2 Sheets-Sheet 1

Inventor
JAMES H. GRAY
By his Attorney

Jan. 1, 1924

J. H. GRAY 1,479,662

SMELTING ORES OF LOW VOLATILE METALS AND MELTING SUCH METALS

Filed Feb. 17, 1921 2 Sheets-Sheet 2

Inventor
JAMES H. GRAY
By his Attorney
D. Anthony Usina

Patented Jan. 1, 1924.

1,479,662

UNITED STATES PATENT OFFICE.

JAMES H. GRAY, OF NEW YORK, N. Y.

SMELTING ORES OF LOW-VOLATILE METALS AND MELTING SUCH METALS.

Application filed February 17, 1921. Serial No. 445,620.

*To all whom it may concern:*

Be it known that I, JAMES H. GRAY, a citizen of the United States, residing in the city, county, and State of New York, have invented certain new and useful Improvements in Smelting Ores of Low-Volatile Metals and Melting Such Metals, of which the following is a specification.

My invention aims to provide a furnace and a method of generating heat therein for the smelting of ores of low volatile metals such as tin ore and for the melting of such metals as tin or brass, for example. The invention is also adapted to various other similar purposes.

In my Patent No. 1,340,951, May 25, 1920, I have described an invention applicable to the same purposes. The arrangement in that patent, however, is such that the heat is radiated largely to the roof with a damaging effect thereon. According to my present invention the roof is more or less shielded from the heat and the heat is better applied to the charge.

The accompanying drawings illustrate embodiments of the invention.

Figure 1:
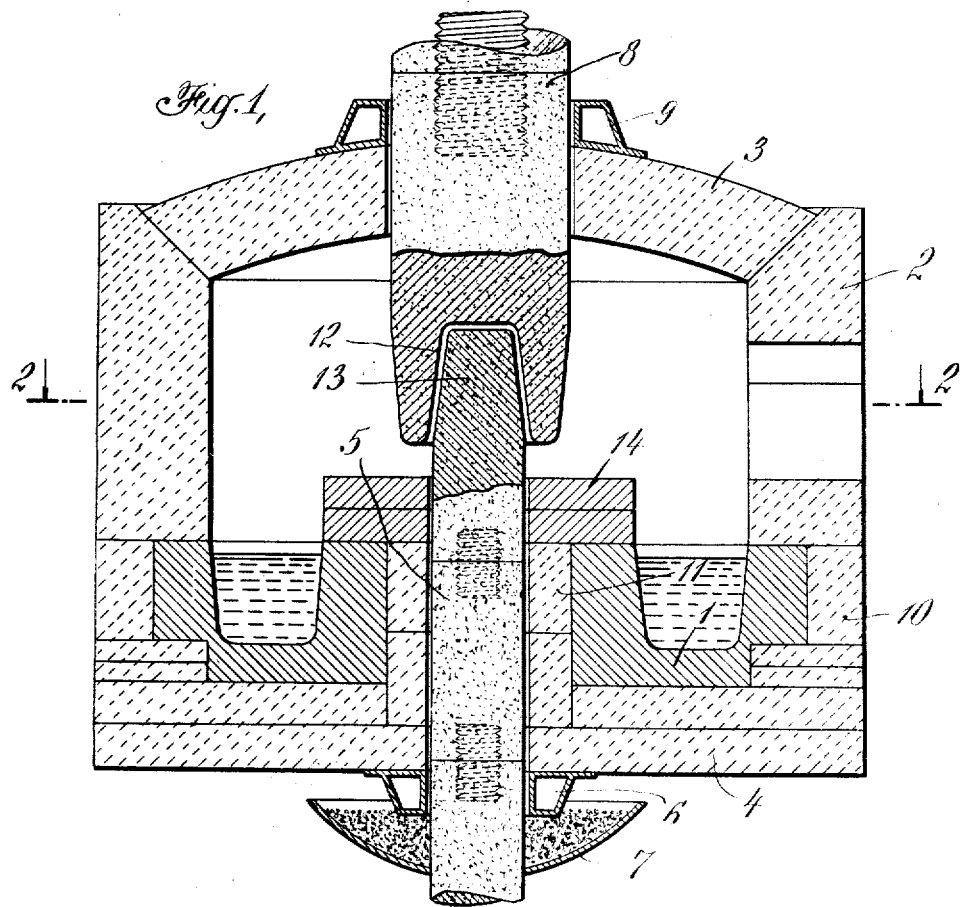
Fig. 1 is a central vertical section of a furnace with a single pair of electrodes at the center.

Referring to the furnace illustrated, an annular hearth 1 is designed to support the charge which may be, for example, one ton c brass to be melted. The hearth is surrounded by a circular wall 2 with a dome shaped roof 3.

The base 4 of the furnace has a central opening for the passage of the lower electrode through any usual or suitable cooling box 6 and stuffing box 7 to prevent access of air to the inside of the furnace. The roof is provided with a central opening for the passage of the upper electrode 8 through any usual or suitable cooling box 9. Proper electrical connections are assumed for passing a current through the electrodes to form an arc between them and for adjusting each of the electrodes independently up and down. The hearth 1 may be made of carbon and pitch rammed in around a removal form surrounded by brickwork 10 and with similar brickwork 11 between the hearth and the lower electrode.

Figure 3:
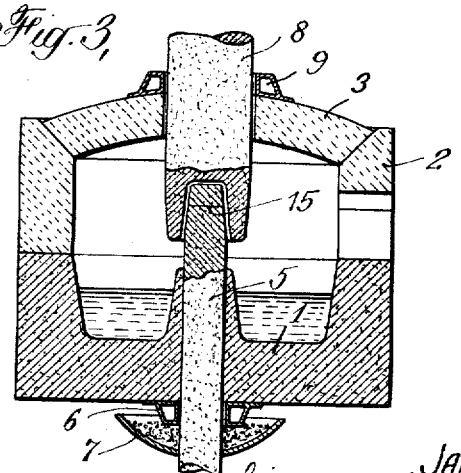
Fig. 3 is a section similar to Fig. 1 of a modified construction.

Or the hearth 1 may be made up of a mass extending from the lower electrode clear to the outside of the furnace, of carbon and pitch molded in place as shown in Fig. 3. Instead of carbon various other refractory materials such as grain magnesia may be used for the hearth or for the hearth and adjacent parts of the base. Or the hearth and other parts of the base may be built up of brickwork.

In operation the large upper electrode will wear in such a way as to form or maintain a flared cavity 12 in its lower end into which the tapered end 13 of the lower electrode will enter. The arc will be within the cavity at or near the top of the lower elctrode so that the heat of the arc will be thrown down toward the base and hearth rather than upward toward the roof. The walls of the upper electrode surrounding the cavity, and the upper end of the lower electrode will be highly heated from the arc and will furnish an incandescent source of heat less violent than that of an exposed arc.

It is is desirable to keep the furnace as free from atmospheric air as possible during the melting period, and the packing 7 is supplied around the lower electrode for this purpose. But a certain amount of air enters the furnace during the charging period and a certain amount of the surfaces of the electrodes is burnt away.

The independent adjustment of the electrodes permits the positioning of the arc at any desired height in the furnace and also permits of controlling the length of the arc maintained between the electrodes.

The voltage used is preferably low, for instance forty to fifty volts. Either alternating or direct current may be used. In the latter case the smaller electrode is preferably connected so as to be negative and to wear away only about half as fast as the larger electrode. I prefer this arrangement in order that the formation of the cavity (produced by the volatilization of the carbon in the arc) may keep pace with the oxidation of the outer surface of the large electrode. The small electrode is protected from oxidation by its concealment within the cavity and by the inert gases which are formed about its end. Also, if graphite be used for the small electrode it generally oxidizes more slowly than amorphous carbon. However, the preferred practice stated may be reversed. I prefer to use graphite for the lower electrode and amorphous carbon for the upper one. Graphite has four times the current-carrying capacity possessed by amorphous carbon. Consequently the upper electrode, if of amorphous carbon, may have twice the diameter of the lower graphite electrode and each electrode will carry the proper amount of current with reference to its conductivity. This arrangement has the further advantage that the small bottom electrode permits the making of the furnace of a correspondingly small diameter, in addition to the fact that the large upper electrode protects the roof from the excessive heat of the arc.

It is possible, however, to use the same material for both electrodes. The bottom electrode will then be designed of a cross-sectional area which will readily carry the required amount of electric current, and the upper electrode would have a cross-sectional area much in excess of that necessary.

Figure 2:
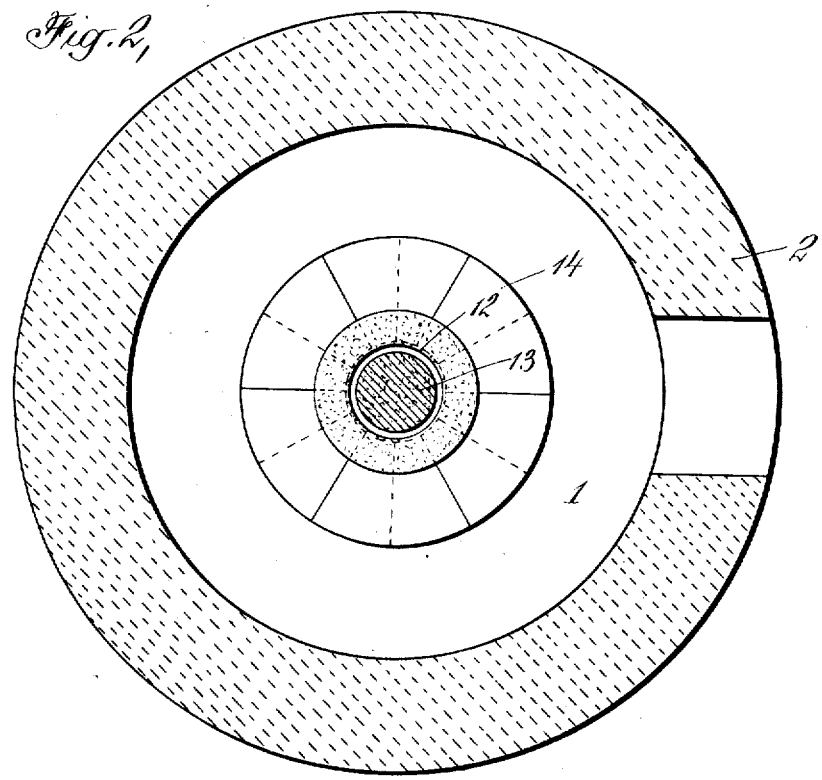
Fig. 2 is a horizontal section of the same on the line 2—2.

Heat is not only radiated from the surface of the larger electrode, as above explained, but is also radiated and reflected downward from the cavity therein and strongly affects the structure of the furnace surrounding the lower electrode. This portion of the furnace, therefore, is preferably made of a most refractory substance, such as carbon. I prefer to use the carbon in the form of bricks 14. They are shown in Figs. 1 and 2 of segmental shape in two courses surrounding the lower electrode and built up on the inner edge of the hearth. These bricks, for example, may be of the material commonly used for electrodes, a mixture of anthracite coal or coke and pitch or tar. It is possible to repair this portion of the furnace from time to time as it is burned away by plastering on a mixture of carbon and pitch or tar, but I prefer to use carbon bricks already baked which may be readily placed in position. Carbon being a good conductor of heat, these bricks 14 or the mass of carbon used at this point will absorb a considerable quantity of heat and transfer it to the inner side of the hearth whence it will be radiated directly to the charge. Instead of carbon the bricks 14 may be made of carborundum or other refractory material.

As stated in connection with Fig. 3 the hearth 1 may be made in a single mass of carbon with the base of the furnace and rammed close up against the lower electrode, which will thus be rendered practically or nearly immovable. The lower electrode may be replaced when ramming in a new bottom. Or as the end of the electrode wears down additional lengths may be placed on top of it as indicated by the junction line 15. The weight of the added piece is sufficient to make proper contact with the part below, and at the high temperature prevailing the two parts fuse or unite so that there is no arcing between them. Instead of having the lower electrode 5 projecting through the bottom as illustrated for the purpose of making electric connection, such connection may be made directly to the shell of the furnace or to metal rods buried in the hearth, the current passing readily from the hearth to the electrode. In fact, the hearth and bottom and the lower electrode 5 are so united as to become practically a single electrode.

For the furnace of Fig. 1 with a hearth having a capacity of one ton of molten brass a suitable size for the electrodes would be eight and sixteen inches in diameter respectively. A suitable current would be four hundred kilowatts at fifty volts, giving a current density of 17.5 amperes per square inch in the amorphous carbon upper electrode and 70 amperes per square inch in the graphite lower electrode.

Fig. 1 shows the electrodes of a common form made in sections with tapered threaded sockets in their ends held together by means of small threaded pins. As the electrodes wear away at their inner ends new sections are added to the outer ends. When starting the furnace for the first time a section may be used on the lower end of the upper electrode with an exposed socket which will be useful as the starting point for the cavity 12 which is to be formed and maintained.

The furnace may be of the stationary type with a tap hole for emptying it or may be of the tilting type in which the molten charge is poured out over a lip at any desired point of the circumference of the hearth. A single phase furnace may be used with one pair of electrodes as shown, or a multiple phase furnace with a corresponding number of pairs of electrodes suitably grouped.

The hottest part of the cavity is at the upper end which is most remote from the surrounding air within the furnace and which is surrounded by the heaviest part of the top electrode. By reason of this temperature the arc itself will occur and be maintained in the upper part of the cavity, even though at times the space to be bridged there is greater than at the sides. The carbon vapor formed and partly imprisoned at this point is quite conductive so that a fairly long arc may be maintained. It will be understood that the cavity shown in the drawings may be considerably changed in shape by the conditions of operation. It is preferred to maintain such conditions that the cavity will be deep enough to provide a considerable body of carbon around it which becoming incandescent, furnishes an excellent heating medium.

Though I have described with great particularity of detail certain embodiments of my invention yet it is not to be understood that the invention is limited to the particular embodiments disclosed. Various modifications in the details and arrangement of the parts of the furnace and in the steps of the process may be made by those skilled in the art without departure from the invention as defined in the following claims.

What I claim is—

1. The method of providing a heat for smelting ores of low volatile metals and similar purposes which consists in maintaining an arc between two vertical electrodes of different diameters so that the upper electrode will direct the heat of the arc downward toward the charge.

2. The method of providing heat for smelting ores of low volatile metals and similar purposes which consists in maintaining a cavity in one electrode with the end of an opposite electrode in said cavity and an arc between the electrodes shielded by the walls of the cavity.

3. The method of providing heat for smelting ores of low volatile metals and similar purposes which consists in maintaining a cavity in the lower end of an upper electrode with the upper end of a lower electrode projecting into said cavity and an arc between said electrodes.

4. The method of providing heat for smelting ores of low volatile metals and similar purposes which consists in maintaining an arc between two electrodes of different diameters, the material of the larger electrode having a lower current-carrying capacity than that of the smaller electrode.

5. The method of providing heat for smelting ores of low volatile metals and similar purposes which consists in maintaining an arc between two electrodes of different diameters, the larger electrode being of amorphous carbon and the smaller electrode of graphite.

6. A furnace for smelting ores of low volatile metals and similar purposes comprising a hearth for the charge and vertically disposed electrodes of different diameters arranged to maintain an arc between them, the electrode of larger diameter being adapted to shield the roof of the furnace from the arc.

7. A furnace for smelting ores of low volatile metals and similar purposes comprising a hearth for the charge and electrodes of different diameters, the smaller electrode adapted to enter a cavity in the larger and to maintain an arc between them and within such cavity, the end of the inner electrode being protected from oxidation by the inert gases within the cavity.

8. A furnace for smelting ores of low volatile metals and similar purposes comprising a hearth for the charge and upper and lower electrodes, the upper being of larger diameter and the lower being of smaller diameter and adapted to enter a cavity in the upper and to maintain an arc between them and within such cavity.

9. A furnace for smelting ores of low volatile metals and similar purposes comprising a hearth for the charge and electrodes of different diameters arranged to maintain an arc between them, the material of the larger electrode having a lower current-carrying capacity than that of the smaller electrode.

10. A furnace for smelting ores of low volatile metals and similar purposes comprising a hearth for the charge and electrodes of different diameters arranged to maintain an arc between them, the larger electrode being of amorphous carbon and the smaller of graphite.

11. A furnace for smelting ores of low volatile metals and similar purposes, said furnace having a hearth and a part formed with a cavity opening downward and means for maintaining an electric arc in said cavity.

12. A furnace for smelting ores of low volatile metals and similar purposes, said furnace having a hearth and having an electrode with a cavity within its end in which the arc is enclosed and maintained so that the surrounding portion of the electrode is highly heated and serves as a heating medium for the charge.

13. A furnace for smelting ores of low volatile metals and similar purposes, said furnace having a hearth and a downwardly projecting electrode with a cavity in its lower end and an upwardly projecting electrode forming with the first electrode an arc in said cavity, so that the electrodes are heated by said arc and form a heating medium for the charge.

14. A furnace for smelting ores of low volatile metals and similar purposes, said furnace having a hearth and a part formed with a cavity opening downward and means for maintaining an electric arc in said cavity, and having a part composed of conductive material exposed to the heat from said arc and arranged to conduct such heat to the hearth.

15. A furnace for smelting ores of low volatile metals and similar purposes comprising a hearth for the charge and an electrode passing through the bottom of the furnace, the portion of the bottom surrounding said electrode being of highly refractory material which is renewable from time to time by the addition of similar material to the top of the exposed surface.

16. A furnace for smelting ores of low volatile metals and similar purposes comprising a hearth for the charge and an electrode passing through the bottom of the furnace, the portion of the bottom surrounding said electrode being formed in its upper part of bricks of highly refractory material so that as this portion wears it can be renewed by the addition of new bricks at the top.

17. A furnace for smelting ores of low volatile metals and similar purposes comprising an annular hearth composed of carbon, and an electrode for supplying current to the furnace surrounded by said annular hearth.

18. A furnace for smelting ores of low volatile metals and similar purposes comprising an annular hearth composed of carbon molded in position with the aid of a binder, and an electrode surrounded by said hearth, said electrode supplying the heating current to the furnace.

19. A furnace for smelting ores of low volatile metals and similar purposes comprising a hearth and an electrode for supplying the heating current to the furnace passing up through the bottom of the furnace, the bank of the hearth being of carbon and forming practically a part of the electrode.

20. A furnace for smelting ores of low volatile metals and similar purposes comprising a hearth formed of conductive material and upper and lower electrodes between which an arc is struck the lower electrode projecting above the general level of the hearth into the furnace.

In witness whereof, I have hereunto signed my name.

JAMES H. GRAY.